(12) United States Patent
Conway, Jr.

(10) Patent No.: US 8,722,121 B2
(45) Date of Patent: May 13, 2014

(54) CANDY HOLDER AND CANDY PRODUCT INCLUDING THE SAME

(75) Inventor: W. Frederick Conway, Jr., New Albany, IN (US)

(73) Assignee: Squire Boone Caverns, Inc., New Albany, IN (US)

( * ) Notice: Subject to any disclaimer, the term of this patent is extended or adjusted under 35 U.S.C. 154(b) by 1028 days.

(21) Appl. No.: 12/412,712

(22) Filed: Mar. 27, 2009

(65) Prior Publication Data

US 2009/0246328 A1   Oct. 1, 2009

Related U.S. Application Data

(60) Provisional application No. 61/040,321, filed on Mar. 28, 2008.

(51) Int. Cl.
*A23G 3/50* (2006.01)
*B65D 85/60* (2006.01)

(52) U.S. Cl.
CPC ..................... B65D 85/60 (2013.01)
USPC ............. 426/104; 426/115; 426/89; 426/90; 426/91; 426/132; 426/134; 446/73

(58) Field of Classification Search
CPC ...................................... B65D 85/60
USPC ............. 426/104, 115, 89, 90, 91, 132, 134; 446/73; 431/292
See application file for complete search history.

(56) References Cited

U.S. PATENT DOCUMENTS

| | | | | |
|---|---|---|---|---|
| 1,528 A | * | 3/1840 | Church | 431/292 |
| 1,334,346 A | * | 3/1920 | Boehm | 426/122 |
| 1,847,415 A | * | 3/1932 | Snell | 294/5.5 |
| 1,920,995 A | * | 8/1933 | Legge | 220/737 |
| 2,299,511 A | * | 10/1942 | Steiner | 426/104 |
| 2,484,776 A | * | 10/1949 | Zent et al. | 206/457 |
| 3,109,596 A | * | 11/1963 | Chernansky | 362/134 |
| 3,615,596 A | * | 10/1971 | Petti et al. | 426/104 |
| 4,548,349 A | * | 10/1985 | Tunberg | 229/800 |

(Continued)

FOREIGN PATENT DOCUMENTS

| | | | | |
|---|---|---|---|---|
| GB | 2 322 283 | * | 8/1998 | A23G 3/00 |
| JP | 2002-249178 | * | 9/2002 | B65D 81/38 |

OTHER PUBLICATIONS

Candy lightsaber photo, Aug. 2005 [on line], retrieved on Jul. 8, 2001. Retrieved from the Internet: URL: <http://www.spielwarenoase.com/product_info.php?info=p153198_Star-Wars-Lightsaber-Pop-.html>.*

(Continued)

*Primary Examiner* — Rena L Dye
*Assistant Examiner* — Chaim Smith
(74) *Attorney, Agent, or Firm* — Berenato & White, LLC

(57) ABSTRACT

A candy holder for receiving and securing an elongated candy therein is provided. The candy holder includes a handle portion defining an elongated cavity with a central axis. The handle portion has a plurality of protrusions extending toward the central axis and circumferentially around an inner surface of the handle portion. A top portion of the candy holder has a lip defining an opening. The opening receives the elongated candy that is dimensioned to correspond to a size of the opening. The lip and protrusions apply friction to a surface of the elongated candy when the elongated candy is inserted therein.

14 Claims, 7 Drawing Sheets

(56) References Cited

U.S. PATENT DOCUMENTS

| | | | |
|---|---|---|---|
| 4,605,124 A * | 8/1986 | Sandel et al. | 206/223 |
| 4,844,252 A * | 7/1989 | Barron et al. | 206/223 |
| 5,168,629 A * | 12/1992 | Willard | 30/231 |
| 5,292,245 A * | 3/1994 | Spoonhour | 431/292 |
| D353,251 S * | 12/1994 | Beck | D1/105 |
| 5,531,318 A * | 7/1996 | Coleman et al. | 206/738 |
| 5,634,885 A * | 6/1997 | Kiro | 600/240 |
| 5,979,695 A * | 11/1999 | Valls et al. | 220/666 |
| 6,048,014 A * | 4/2000 | Stefanik | 294/99.1 |
| 6,054,156 A * | 4/2000 | Rudell et al. | 426/104 |
| 6,375,236 B1 * | 4/2002 | Ducharme | 294/5.5 |
| 6,383,536 B1 * | 5/2002 | Palmer et al. | 426/104 |
| 6,779,644 B2 * | 8/2004 | Ackermann | 192/109 F |
| 7,036,776 B1 * | 5/2006 | Armstrong | 248/157 |
| 2007/0098852 A1 * | 5/2007 | Ellis | 426/90 |

OTHER PUBLICATIONS

Lightsaber candy, 2006, [on line], retrieved on Jul. 8, 2011. Retrieved from the Internet: URL: <http://www.flickriver.com/photos/weescot/34556037/>.*

* cited by examiner

CANDY HOLDER AND CANDY PRODUCT INCLUDING THE SAME

CROSS-REFERENCE TO RELATED APPLICATION AND CLAIM TO PRIORITY

The present application relates to U.S. Provisional Patent Application No. 61/040,321 filed Mar. 28, 2008, the contents of which are incorporated herein by reference and to which priority is claimed.

FIELD OF THE INVENTION

The present invention relates to a candy holder and a candy product including the same. The present invention also relates to a method of using the candy holder.

BACKGROUND OF THE INVENTION

There are various types of elongated candies that people eat. For example, candy sticks or candy canes have been popular for many years. However, these candies have a tendency to become sticky when the consumer begins dissolving the candy in his or her mouth. Especially children have a tendency to make a mess when eating large elongated candy items that cannot be ingested in one bite. When the candy gets messy, the consumer (or the consumer's parent) may become frustrated and throw the remaining candy away. As a result, good candy is wasted.

Thus, there is a need for a device or holder that allows a user to securely hold the candy without getting his or her hands and fingers dirty while at the same time being able to enjoy the candy.

SUMMARY OF THE INVENTION

A candy holder for receiving and securing an elongated candy therein is provided. The candy holder includes a handle portion defining an elongated cavity with a central axis. The handle portion has a plurality of protrusions extending toward the central axis and circumferentially around an inner surface of the handle portion. A top portion of the candy holder has a lip defining an opening. The opening receives the elongated candy that is dimensioned to correspond to a size of the opening. The lip and protrusions apply friction to a surface of the elongated candy when the elongated candy is inserted therein.

DESCRIPTION OF THE EMBODIMENT(S) OF THE INVENTION

Figure 1:
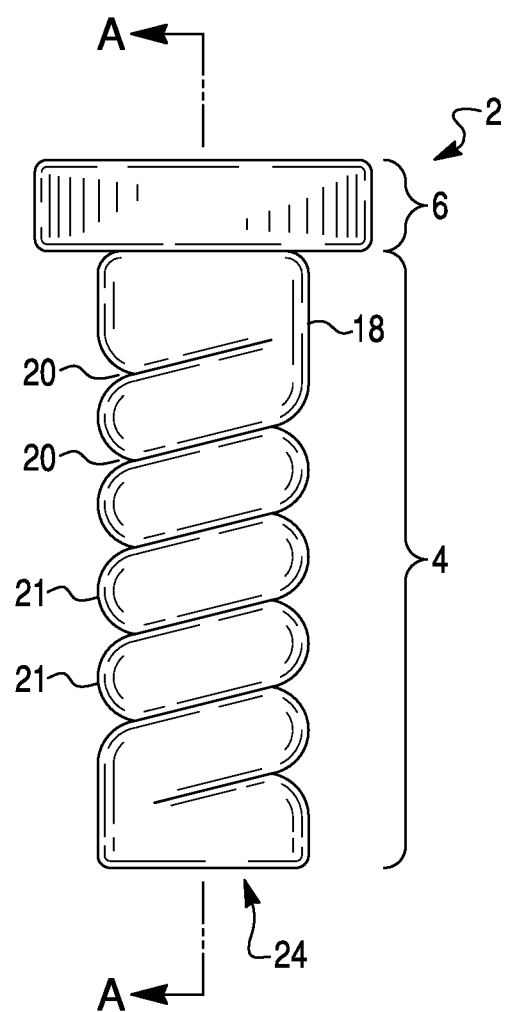
FIG. 1 is an elevational view of a candy holder according to an embodiment the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods.

As best shown in FIGS. 1 to 4, a candy holder 2 includes a handle portion 4 and a top portion 6. The handle portion 4 is grasped by a user's hand while the top portion 6 rests on top of the user's hand. An opening 8 for receiving an elongated candy 10 is arranged in the top portion 6 and into handle portion 4. An elongated cavity 12 in which the elongated candy 10 is to be disposed extends inwardly from the top portion 6 into the handle portion 4. The cavity 12 has a central axis C.

The handle portion 4 and the top portion 6 house a lower part of the elongated candy 10 while a portion of the elongated candy 10 remains exposed above the top portion 6. The handle and top portions 4 and 6 have shapes that are substantially cylindrical. As best shown in FIGS. 1 to 5, the outer dimension of the top portion 6 ($D_2$) is greater than the outer dimension of the handle portion 4 ($D_1$) so that the top portion 6 separates the user's hand from the exposed portion of the elongated candy 10.

An inner surface 14 of the handle portion 4 is defined by a series of ridged protrusions 16, resembling roping, extending around a circumference of the cavity 12. The ridged protrusions 16 on the inner surface 14 of the cavity 12 may correspond to a series of recesses 20 arranged around a circumference of an outer surface 18 of the handle portion 4. The recesses 20 may be arranged diagonally around the handle portion 4 to provide the appearance of a spiral. The recesses 20 define several consecutive rounded edges 21 therebetween that form the outer surface 18 of the handle portion 4.

The opening 8 in the top portion 6 is defined by a lip 22 that provides just enough space for the elongated candy 10 to be inserted into the cavity 12. In other words, the candy 10 is frictionally sealed to lip 22, so that in cooperation with inner wall 14 candy 10 remains upright for consumption.

The candy holder 2 also includes a closed bottom portion 24 that stops the insertion of the elongated candy 10 once the elongated candy 10 contacts a surface of the closed bottom portion 24.

Figure 4:
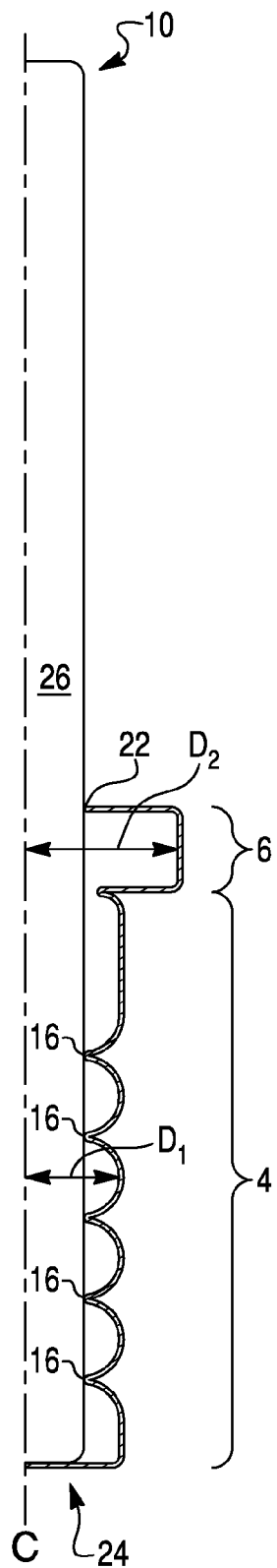
FIG. 4 is a partial side view of the candy holder shown in FIG. 2 with an elongated candy disposed therein.
Figure 5:
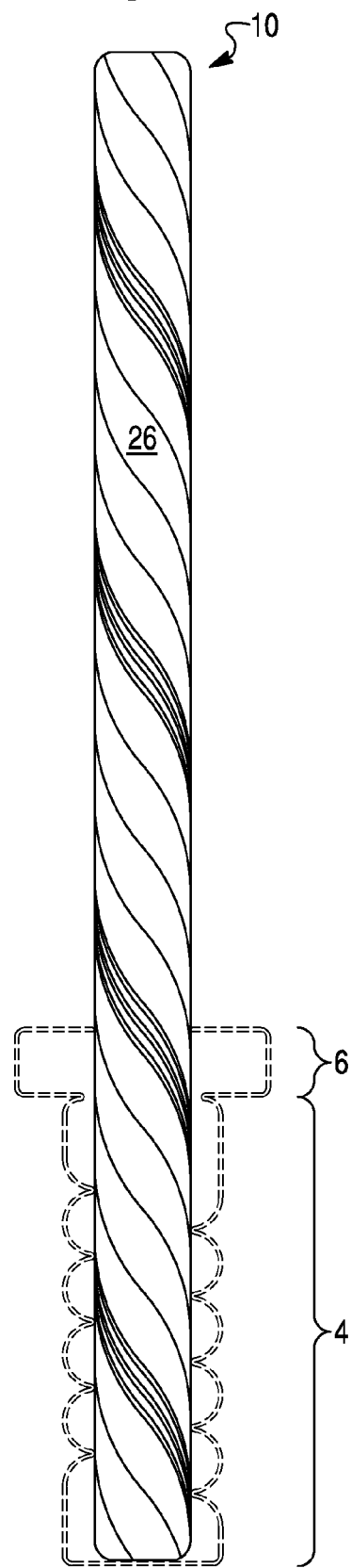
FIG. 5 is an elevational view of the candy holder and the elongated candy with portions of the candy holder shown in phantom.

As best shown in FIGS. 4 and 5, the lip 22 and the ridged protrusions 16 contact an outer surface 26 of the elongated candy 10. The lip 22 and the ridged protrusions 16 provide friction against the outer surface 26 of the elongated candy 10. As a result, the elongated candy 10 is secured in the cavity 12 such that the candy holder 2 can be inverted without the elongated candy 10 sliding out of the cavity 12. That is, the friction created by lip 22 and the protrusions 16 maintains the elongated candy 10 secured in the candy holder 2. Thus, children can handle the candy holder 2 and elongated candy 10 in a care free manner without dirtying their hands while the elongated candy 10 remains secured in the candy holder 2.

As the elongated candy 10 is being inserted into the cavity 12, the lip 22 and ridged protrusions 16 come in contact with the outer surface 26 of the elongated candy 10, one by one. With each protrusion 16 that comes into contact with the outer surface 26 of the elongated candy 10, the insertion of the elongated candy 10 into the cavity 12 becomes increasingly difficult. That is, the amount of force required to move the elongated candy 10 in or out of the cavity 12 increases the further into the cavity 12 that the elongated candy 10 is disposed. This occurs because each additional protrusion 16 that contacts the elongated candy 10 increases the total friction on the surface 26 of the elongated candy 10. Moreover, the diameter of cavity 12 preferably decreases from top portion 6 to bottom portion 24, which creates further additional friction securing candy 10 in cavity 12.

The candy holder 2 is preferably made from a thin flexible plastic that will provide some "give" when the elongated candy 10 is inserted into the cavity 12 of the candy holder 2. Additionally, the diameter or outer dimension of the elongated candy 10 is selected to be slightly greater than or equal to the dimension of the opening 8 defined by the lip 22 and the cavity 12 defined by the ridged protrusions 16 so that the insertion of the elongated candy 10 displaces the shape of the candy holder 2 for a snug fit. Because the plastic is flexible, the lip 22 and ridged protrusions 16 contour to the outer surface 26 of the elongated candy 10 to maximize the surface area of the candy holder 2 that is in contact with the elongated candy 10. As a result, the friction is also maximized in this manner.

Figure 2:
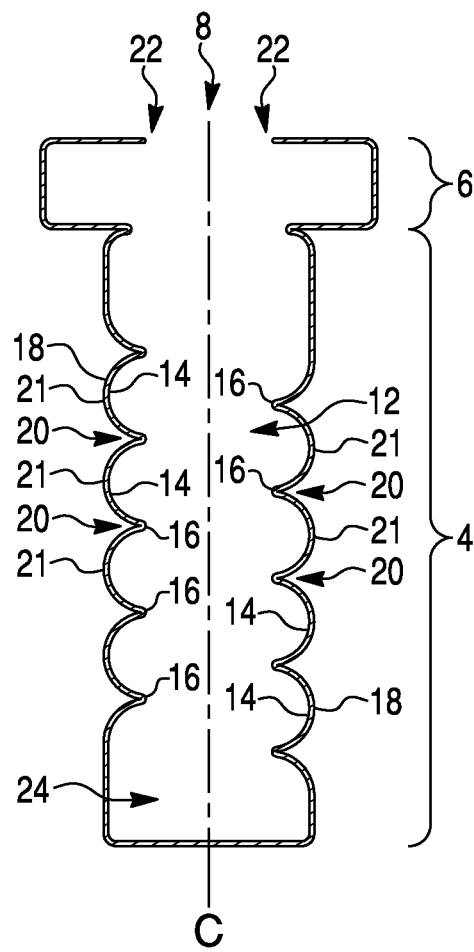
FIG. 2 is a cross-sectional outline view of the candy holder of FIG. 1.
Figure 3:
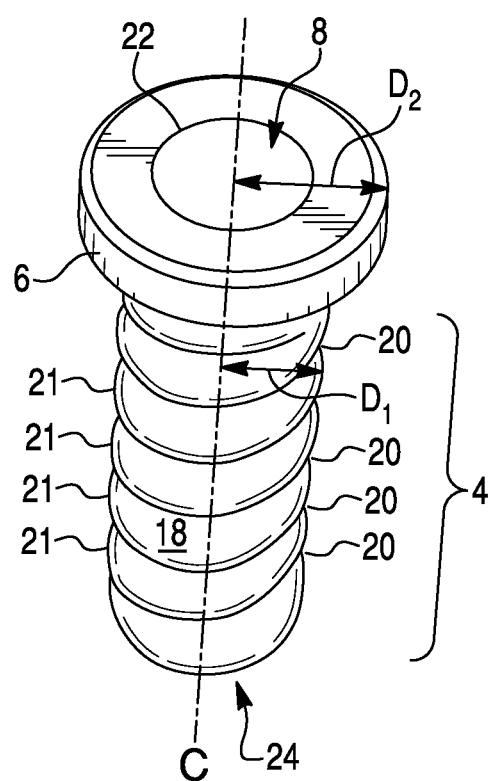
FIG. 3 is a perspective view of the top of the candy holder of FIG. 1.

The lip 22 drags in the direction of movement of the elongated candy 10. That is, when the elongated candy 10 is being inserted into the opening 8, the lip 22 is dragged downwardly to exert an upward resistance force on the elongated candy 10. Likewise, when the elongated candy 10 is being pulled from the opening 8, the lip 22 is dragged upwardly to exert a downward resistance force on the elongated candy 10. The ridged protrusions 16 operate similarly to the lip 22. However, as best shown in FIG. 2, the lip 22 may extend further across the cavity 12 than the ridged protrusions 16.

The ridged protrusions 16 may each have the same horizontal dimensions. That is, the ridged protrusions 16 may each extend into the cavity 12 by an equal distance.

Figure 6:
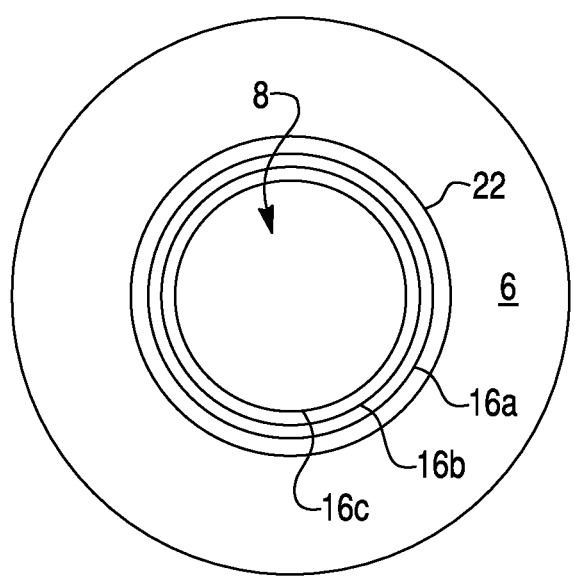
FIG. 6 is a top plan view of the candy holder according to another embodiment of the present invention.

Alternatively, the ridged protrusions 16a, 16b, and 16c may gradually extend further into the cavity 12 as best shown in FIG. 6. FIG. 6 is a top plan view looking into the candy holder 2 from the opening 8. In this case, the insertion of the elongated candy 10 into the cavity 12 becomes increasingly difficult due to the reduction in the amount of available space toward the bottom of the cavity 12. That is, the lower ridged protrusion 16c provides a greater resistance to the movement of the elongated candy 10 within the cavity 12 than the upper ridged protrusion 16a.

Figure 7:
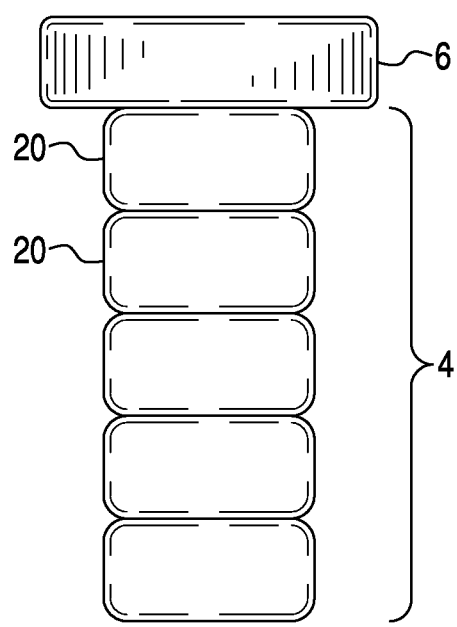
FIG. 7 is an elevational view of the candy holder according to yet another embodiment of the present invention.

As best shown in FIG. 7, the recesses 20 defined in the outer surface 18 of the handle portion 4, which define the ridged protrusions 16 (not shown) on the inner surface 14 (not shown) of the cavity 12 (not shown), may alternatively be arranged horizontally rather than diagonally.

A method of using the candy holder 2 shown in FIGS. 1 to 6 includes inserting the elongated candy 10 into the cavity 12 until an end of the elongated candy 10 contacts the closed bottom portion 24 of the candy holder 2. A user can then grasp the handle portion 4 of the candy holder 2 and enjoy the candy 10 without making a mess.

In some embodiments, the elongated candy 10 may be approximately 8.5 inches in length and 0.75 inches in diameter. The top portion 6 of the candy holder 2 may be approximately 1.5 inches across, while the handle portion 4 may be roughly an inch across. The opening 8 in the top portion 6 may be approximately 0.75 inches in diameter or slightly less. These dimensions are exemplary and are not intended to limit the scope of the invention, unless explicitly recited in a claim. It will be understood that other dimensions may alternatively be used.

Additionally, although the embodiments of the invention have been described with reference to an elongated candy 10, it will be appreciated by those of ordinary skill in the art that other types of candy products of various shapes and sizes can be used with the candy holder 2. For example, a candy cane can alternatively be secured in the candy holder 2.

Although embodiments of the present invention have been shown and described, it will be appreciated by those skilled in the art that changes may be made in these embodiments without departing from the principles and spirit of the invention, the scope of which is defined in the appended claims and their equivalents.

What I claim is:

1. A candy and holder combination, comprising:
    an elongated candy comprising an exterior surface; and
    a candy holder removably receiving the elongated candy therein, the candy holder comprising a handle portion and a top portion cooperating to define a cavity having a central axis, the handle portion comprising an inner surface, a bottom surface, a lateral first protrusion extending circumferentially around the inner surface and extending into the cavity a first radial distance, and a lateral second protrusion extending circumferentially around the inner surface and extending into the inner cavity a second radial distance that is greater than the first radial distance, the second protrusion positioned in closer proximity to the bottom surface than the first protrusion, the top portion comprising a lip extending laterally into the cavity to define an opening through which the elongated candy is received in the candy holder,
    wherein the elongated candy extends into the cavity so that the exterior surface contacts the first protrusion to create a first interface having a first coefficient of friction and the exterior surface contacts the second protrusion to create a second interface having a second coefficient of friction greater than the first coefficient of friction and at least a portion of the elongated candy extends from the top portion.

2. The combination according to claim 1, wherein the handle portion further comprises a lateral third protrusion arranged on the inner surface extending into the cavity a third radial distance.

3. The combination according to claim 1, wherein the lip and the lateral protrusion apply friction to the surface of said candy.

4. The combination according to claim 1, wherein the opening is smaller than a lateral dimension of the elongated candy.

5. The combination according to claim 1, wherein the candy holder comprises flexible plastic.

6. The combination according to claim 1, wherein the lip extends further into the cavity than the first and second protrusions.

7. The combination of claim 1, wherein the candy holder further comprises an outer surface having a series of ridges and depressions, the ridges having an outer diameter of equal diameter.

8. The combination of claim 1, wherein the exterior surface of the elongated candy is cylindrical with a constant outer diameter.

9. A candy and holder combination, comprising:
    an elongated candy including an outer surface having an outer surface diameter; and
    a candy holder comprising a hollow handle portion and a top portion connected to one another, the handle portion comprising a side wall and a bottom wall, the side wall comprising a side wall outer surface and a side wall inner surface, the side wall inner surface defining a cavity of the candy holder in which the elongated candy is received, the side wall further comprising a first deformation establishing a first recess in the side wall outer surface and a corresponding first protrusion on the side wall inner surface opposite to the first recess, a second deformation establishing a second recess in the side wall outer surface and a corresponding second protrusion on the side wall inner surface opposite to the second recess, the top portion having an opening through which the elongated candy extends into the cavity and contacts the first and second protrusion, wherein the friction between the outer surface of the elongated candy and the second protrusion is greater than the friction between the outer surface of the elongated candy and the first protrusion.

10. The candy holder of claim 9, wherein the top portion comprises a lip extending into the opening.

11. The candy holder of claim 9, wherein the first protrusion extends circumferentially around the inner surface.

12. The candy holder of claim 10, wherein the opening has a diameter less than the outer diameter of the elongated candy.

13. The candy holder of claim 9, wherein the first recess and the first protrusion extend circumferential around the candy holder.

14. The candy holder of claim 9, wherein the outer surface is cylindrical and the outer surface diameter is constant.

\* \* \* \* \*